C. R. CHENERY.
PAPER JAR OR RECEPTACLE.
APPLICATION FILED APR. 23, 1918.
1,312,434.
Patented Aug. 5, 1919.
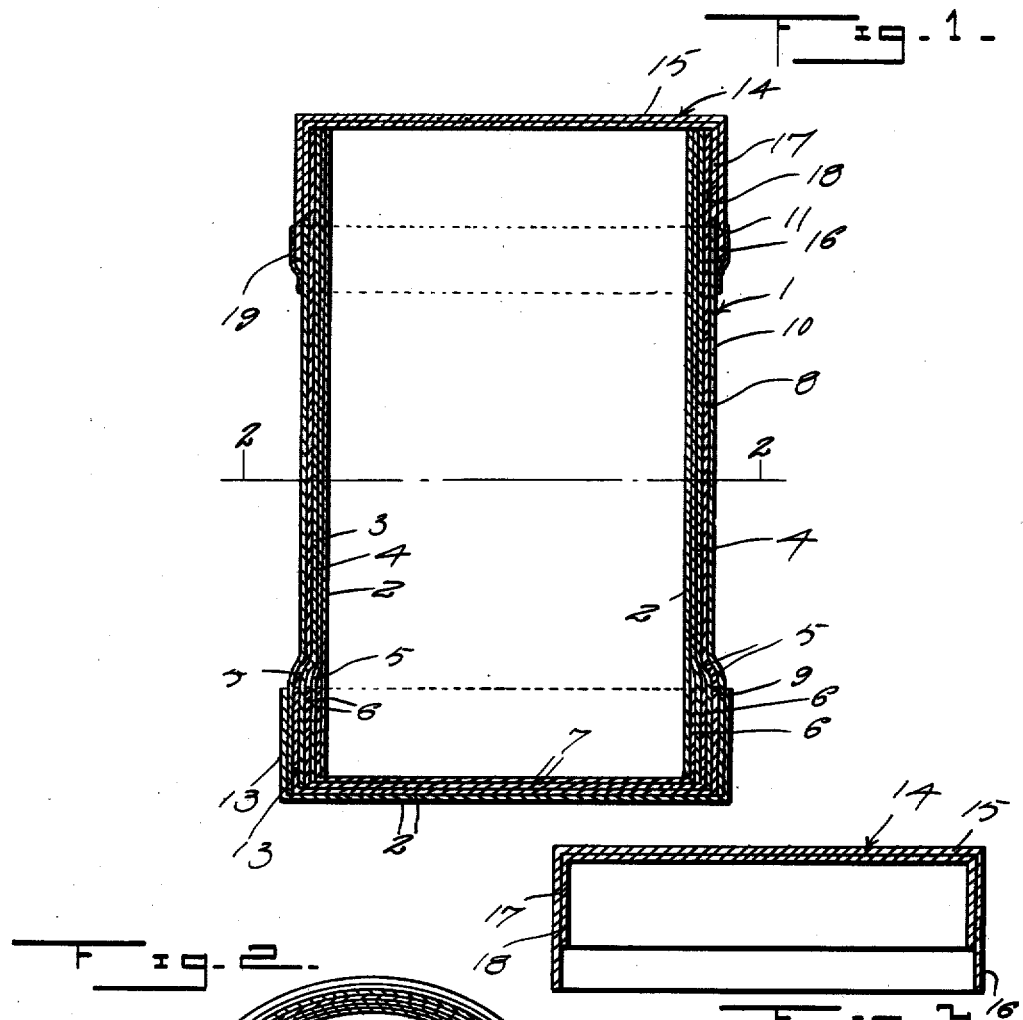

UNITED STATES PATENT OFFICE.

CHARLES R. CHENERY, OF BUFFALO, NEW YORK.

PAPER JAR OR RECEPTACLE.

1,312,434.      Specification of Letters Patent.      Patented Aug. 5, 1919.

Application filed April 23, 1918. Serial No. 230,319.

*To all whom it may concern:*

Be it known that I, CHARLES R. CHENERY, a citizen of the United States, residing at Buffalo, in the county of Erie and State of New York, have invented certain new and useful Improvements in Paper Jars or Receptacles; and I do hereby declare the following to be a full, clear, and exact description of the invention, such as will enable others skilled in the art to which it appertains to make and use the same.

This invention relates to improvements in a paper jar or receptacle.

The object of this invention is to provide a paper jar or receptacle made at a comparatively small cost so that it may be thrown away after being used, thereby enabling the contents to be sold to the public in these containers at a comparatively small figure and absolutely free from contamination.

Another object of this invention is to provide a paper receptacle which is absolutely water proof and when sealed will be air tight and sanitary, thereby providing a receptacle used for preserving or canning.

A further object of this invention is to provide a paper receptacle or jar constructed of wax paper and cardboard, and means for sealing the cap to one open end of the container when assembled.

A still further object of this invention is to provide a paper jar or receptacle of this character, which will be simple, practical and comparatively inexpensive in construction, and one that can be manufactured and sold at a low cost.

With these and other objects in view, the invention consists in the novel combination and arrangement of parts as will be hereinafter more fully described and claimed.

In the drawing:

Figure 1 is a vertical sectional view taken through the container made in accordance with this invention, Fig. 2 is a horizontal sectional view taken on the line 2—2 of Fig. 1, Fig. 3 is a sectional view of the removable cap.

Like numerals of reference designate corresponding parts in all the figures of the drawing.

Referring to the drawing, the numeral 1 designates a paper receptacle or jar in its entirety and it is here shown as cylindrical in cross section, it being understood that any other desired configuration may be resorted to. The receptacle 1 comprises in its construction, preferably three layers of wax paper constituting the inner wall 2, the outer wall 3 and the intermediate wall 4. The three layers of wax paper, 2, 3 and 4 respectively constitute the inner body of the receptacle and provide a sanitary water proof device, which will prevent the absorbing of the contents placed within the body when the same is in its assembled position.

The lower ends of the intermediate and outer walls of the inner body are offset as at 5 to provide a space for receiving the vertical annular flange 6 of each of the wax paper caps 7, which wax paper caps 7 constitute the bottom of the receptacle and close the lower open end of the inner body of wax paper.

The intermediate wall 3 of wax paper is completely covered by a cardboard inner wall 8, which completely covers the intermediate wall 3 of wax paper and terminates adjacent the lower end thereof as at 9.

The inner wall 8 of cardboard is completely covered by an outer wall 10 of cardboard, which wall extends completely beyond and remains flush with the lower edges of the caps 7 constituting the bottom wall. The upper edge of the outer wall 10 of cardboard terminates adjacent the upper edge thereof as at 11, the purpose of which will be hereinafter more fully described.

A pair of cardboard caps 12 are provided with the vertical annular flanges 13, and the annular flange of the first cardboard is disposed between the lower end of the outer wall of the inner body of wax paper and the lower end of the outer wall of the body of cardboard, as illustrated. The upper edge of the inner cap abuts the lower edge 9 of the inner wall of the cardboard body. The flange 13 of the outer cardboard cap 12 embraces the lower end of the outer wall 10 of the cardboard body. It is to be understood that by this construction, the overlapping of the different ends of the various caps and inner walls provides an air tight joint, thus preventing air into the contents of the receptacle when sealed.

A removable cap designated in its entirety by the numeral 14 is constructed of cardboard and has an outer layer 15, which has an annular depending vertical flange 16 and located within the outer layer 15 is the inner cap 17, which has its vertical flange 18 terminating adjacent the open end of the cap 15, as illustrated. The cap 14 is removably arranged over the open end of the receptacle and the edge of the flange 18 rests upon the upper edge 11 of the outer wall 10 of the cardboard body, while the flange 16 of the outer cap 15 overlies this point and has engagement with the outer wall 10 of the inner cap 18, thus completely closing this joint and preventing air from passing into the receptacle when in closed position.

A sealing strip 19 is secured to the exterior of the outer wall 10 of the body and the lower edge of the flange 16 of the outer cap 15, thus effectively securing the removable cap 14 to the body of the receptacle and the device is in its assembly.

In use, the jar or receptacle is assembled in the manner described with its cap 14 removed. The inner body is filled with the desired article, liquefied or otherwise and the cap is replaced in the manner described the sealing strip 19 adhered thereto, thus an air tight sanitary receptacle is provided.

What is claimed is:

1. A receptacle including a cylindrical body constructed of a plurality of layers, the outer layer of which terminates below the top of the body, a removable cover having a flanged side constructed of inner and outer layers, the inner layer of the flanged side terminating above the outer layer of the flanged side and engaging the top of the outer layer of the cylindrical body, the outer layer of the flanged side overlapping the upper portion of the outer layer of the body, and an annular sealing strip secured to the body and overlapping the lower edge of the outer layer of the flanged side.

2. A receptacle including a body constructed of a plurality of layers, certain of which terminate at a point spaced above the lower end of the body, a bottom having a flanged side constructed of a plurality of layers disposed between and surrounding the layers of the body and abutting the lower ends of the layers of the body which terminate above the lower end of the same.

In testimony whereof I affix my signature in presence of two witnesses.

CHARLES R. CHENERY.

Witnesses:
WALTER J. WEEGAARD,
GEO. C. HALLIDAY.